(12) United States Patent
Fujiwara (10) Patent No.: US 6,501,248 B2
(45) Date of Patent: Dec. 31, 2002

(54) CHARGE/DISCHARGE PROTECTION APPARATUS HAVING A CHARGE-STATE OVERCURRENT DETECTOR, AND BATTERY PACK INCLUDING THE SAME

(75) Inventor: Akihiko Fujiwara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/955,209

(22) Filed: Sep. 19, 2001

(65) Prior Publication Data

US 2002/0050806 A1 May 2, 2002

(30) Foreign Application Priority Data

Sep. 28, 2000 (JP) ........................... 2000-296457

(51) Int. Cl.[7] ............................................. H01M 10/46
(52) U.S. Cl. ............................................. 320/136
(58) Field of Search ........................... 320/134, 136, 320/135, 132

(56) References Cited

U.S. PATENT DOCUMENTS 5,936,384 A    8/1999   Fujiwara et al.
5,959,436 A *  9/1999   Takashina et al. .......... 320/134
5,990,663 A * 11/1999   Mukainakano ............... 320/134
6,316,915 B1  11/2001   Fujiwara et al.

FOREIGN PATENT DOCUMENTS

JP   9-182283    7/1997
JP   11-103528   4/1999

* cited by examiner

*Primary Examiner*—Edward H. Tso
(74) *Attorney, Agent, or Firm*—Dickstein Shapiro Morin & Oshinsky LLP (57) ABSTRACT

A charge/discharge protection apparatus of the present invention includes a switch provided on a charge/discharge current line, the charge/discharge current line being connected to a secondary battery of a battery pack. A charge-state overcurrent detector outputs a control signal when a charge-state overcurrent condition of the battery is detected in a charge state of the battery pack. A control unit sets the switch in OFF state to cut off connection between the charge/discharge current line and the battery in response to the control signal output by the charge-state overcurrent detector. The charge/discharge protection apparatus has a capability to detect the charge-state overcurrent condition of the battery, and protects the secondary battery from being damaged due to the charge-state overcurrent condition.

13 Claims, 7 Drawing Sheets

CHARGE/DISCHARGE PROTECTION APPARATUS HAVING A CHARGE-STATE OVERCURRENT DETECTOR, AND BATTERY PACK INCLUDING THE SAME

BACKGROUND OF THE INVENTION

1. Field of the Invention

The present invention relates to a charge/discharge protection apparatus provided in a battery pack that supplies power to a mobile electronic system, the charge/discharge protection circuit protecting a secondary battery, such as a lithium-ion battery, from being damaged when the battery is placed in an overcharge condition, an over-discharge condition, a discharge-state overcurrent condition or a charge-state overcurrent condition. Further, the present invention relates to a battery pack in which the secondary battery and the charge/discharge protection circuit are provided.

2. Description of the Related Art

In recent mobile electronic systems, a battery pack containing a secondary or rechargeable battery, such as a lithium-ion battery, is often used as the power supply that supplies power to the mobile electronic system. When the time the lithium-ion battery continues to be in overcharge condition is excessively long, the deposition of lithium metal will occur, which damages the battery pack or the mobile electronic system. On the other hand, when the time the lithium-ion battery continues to be in an over-discharge condition is excessively long, the repetitive charge/discharge operational life of the battery pack will deteriorate.

Conventionally, in order to eliminate the problems, a protection switch is provided on the charge/discharge current line between the secondary battery and the electronic system body. The protection switch is turned off when the overcharge condition or the over-discharge condition of the battery is detected, so as to disconnect the secondary battery from the charge/discharge current line. By using the protection switch, it is possible to avoid the continuation of the overcharge condition or the over-discharge condition of the secondary battery.

For example, Japanese Laid-Open Patent Application No. 11-103528 discloses a charge/discharge protection circuit for protecting a secondary battery from damage, which detects an overcharge condition, an over-discharge condition or a discharge-state overcurrent condition of the battery. In the protection circuit of the above document, the terminal to which the voltage of the battery is applied is constructed in a low voltage-resistance structure, and only the terminal to which the voltage of the charger (part of the semiconductor device) is applied is constructed in a high voltage-resistance structure. Such configuration allows the high voltage-resistance structure of the entire protection circuit, and it is possible to safely prevent the damaging of the protection circuit even when an improper charger is erroneously attached to supply a high voltage to the secondary battery.

The conventional protection circuit of the above document is capable of detecting the discharge-state overcurrent condition only. However, the conventional protection circuit of the type is not provided with a function of detecting a charge-state overcurrent condition of the battery. In order to protect the damaging of the secondary battery in the charge state after an improper charger (a defective or broken charger) is attached to the battery pack, the conventional protection circuit requires an externally attached fuse or the like. For this purpose, the conventional protection circuit including a mounting portion for the externally attached fuse has to be large in size, and the manufacturing cost will be raised.

Figure 7:
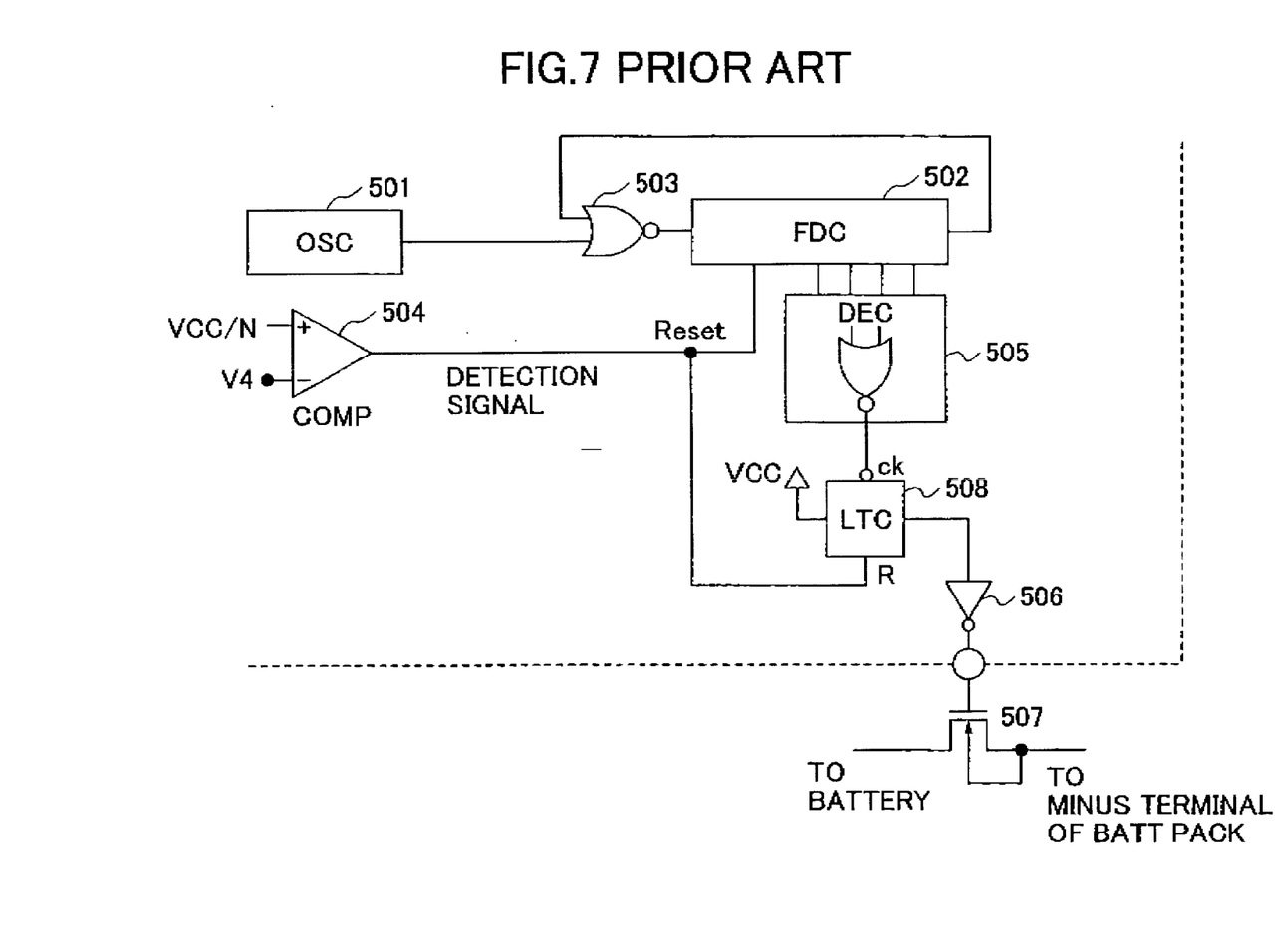
FIG. 7 is a block diagram of a conventional charge/discharge protection circuit.

Further, Japanese Laid-Open Patent Application No. 9-182283 discloses a charge/discharge protection circuit which detects any of an overcharge condition, an over-discharge condition and a discharge-state overcurrent condition of a lithium-ion battery. FIG. 7 shows a conventional charge/discharge protection circuit which is disclosed in the above document.

Generally, when the battery voltage is nearly equal to an operation stop voltage at which the discharging operation should be stopped, the voltage margin becomes small and a malfunction in the protection circuit due to a rapid change of the loading voltage is likely to occur. The setting of the protection switch in OFF state immediately after the battery voltage is equal to the operation stop voltage is avoided. It is desirable to set the protection switch in OFF state only when it is determined that the time the secondary battery is continuously set in any of the overcharge condition, the over-discharge condition and the discharge-state overcurrent condition exceeds a given reference period. To detect any of the overcharge condition, the over-discharge condition and the discharge-state overcurrent condition of the secondary battery, the conventional charge/discharge protection circuit in FIG. 7 utilizes a timer including an internal oscillator and a frequency-division counter.

As shown in FIG. 7, the conventional charge/discharge protection circuit is formed on an integrated circuit (IC) chip, and it generally includes an internal oscillator (OSC) 501, a frequency-division counter (FDC) 502, an OR gate 503, a voltage comparator (COMP) 504, a decoder (DEC) 505, an inverter 506, a protection switch 507, and a latch (LTC) 508.

In the conventional charge/discharge protection circuit of FIG. 7, the voltage comparator 504 compares a divided battery voltage VCC/N with a given reference voltage V4. When the battery voltage VCC is detected as being less than the operation stop voltage, the voltage comparator 504 outputs a low-level detection signal to the counter 502. At this time, the resetting of the counter 502 to zero is canceled by the low-level detection signal, so that the counter 502 starts counting. When the count value obtained at the counter 502 reaches a predetermined value that is set to the decoder 505, the decoder 505 sets the latch 508 so as to set the protection switch 507 in OFF state. The protection switch 507 is constructed by a MOS (metal-oxide semiconductor) transistor.

However, when the battery voltage is raised to a level higher than the operation stop voltage before the count value reaches the predetermined value, the voltage comparator 504 outputs a high-level detection signal (reset signal) to the counter 502. At this time, the counting of the counter 502 is canceled by the reset signal, so that the count value thereof is reset to zero. If the predetermined value that is set to the decoder 505 is made to a comparatively large value, it is possible to prevent the erroneous operation of the protection switch 507 even when the battery voltage VCC is temporarily changed to the level below the operation stop voltage due to a change of the loading voltage.

The above operation of the conventional protection circuit is given for explaining the detection of the over-discharge condition. Similar to the detection of the over-discharge condition, the delay time upon detection of the overcharge condition or the discharge-state overcurrent condition can be controlled by using the internal oscillator 501 and the counter 502 in the conventional protection circuit. Conventionally, in order to determine the delay times upon detection of these conditions, an externally attached capacitor has been needed on the protection circuit IC. According to the above-described conventional protection circuit of FIG. 7, the externally attached capacitor is no longer needed, and it is possible to reduce the total number of circuit components needed for the protection circuit.

The conventional protection circuit of FIG. 7 is not provided with a function of detecting a charge-state overcurrent condition of the battery. In order to protect the damaging of the battery in the charge state after an improper charger is attached to the battery pack, the conventional protection circuit requires an externally attached fuse or the like.

Further, the delay time upon detection of the over-discharge condition or the discharge-state overcurrent condition of the battery is usually set to a time on the order of 10 to $10^2$ ms. However, the delay time when detecting the overcharge condition of the battery is usually set to a time on the order of several $10^3$ ms. In the conventional protection circuit disclosed in the above document (JP 9-182283), it is difficult to shorten the testing time when performing an operation test of the conventional protection circuit that requires accurate measurement of the detection voltage with respect to the overcharge condition.

SUMMARY OF THE INVENTION

An object of the present invention is to provide an improved charge/discharge protection apparatus in which the above-described problems are eliminated.

Another object of the present invention is to provide a charge/discharge protection apparatus which is capable of detecting a charge-state overcurrent condition of a secondary battery, and safely and reliably protects the battery against the charge-state overcurrent condition with no need for an externally attached fuse, by eliminating the charge-state overcurrent condition of the battery in an appropriate manner.

Another object of the present invention is to provide a charge/discharge protection apparatus which can shorten the testing time when conducting an operation test of the charge/discharge protection apparatus that requires accurate measurement of the detection voltage with respect to the overcharge condition.

Another object of the present invention is to provide a battery pack which includes a secondary battery and a charge/discharge protection apparatus, the charge/discharge protection apparatus having a capability to detect a charge-state overcurrent condition of a secondary battery, and safely and reliably protecting the battery against the charge-state overcurrent condition, with no need for an externally attached fuse, by eliminating the charge-state overcurrent condition of the battery in an appropriate manner.

The above-mentioned objects of the present invention are achieved by a charge/discharge protection apparatus for protecting a secondary battery of a battery pack from damage, the charge/discharge protection apparatus comprising; a switch which is provided on a charge/discharge current line, the charge/discharge current line being connected to the battery; a charge-state overcurrent detector outputting a control signal when a charge-state overcurrent condition of the battery is detected in a charge state of the battery pack; and a control unit which sets the switch in OFF state to cut off connection between the charge/discharge current line and the battery in response to the control signal output by the charge-state overcurrent detector, The above-mentioned objects of the present invention are achieved by a battery pack including a secondary battery and a charge/discharge protection apparatus, the charge/discharge protection apparatus comprising: a switch which is provided on a charge/discharge current line, the charge/discharge current line being connected to the battery; a charge-state overcurrent detector outputting a control signal when a charge-state overcurrent condition of the battery is detected in a charge state of the battery pack; and a control unit which sets the switch in OFF state to cut off connection between the charge/discharge current line and the battery in response to the control signal output by the charge-state overcurrent detector.

In the charge/discharge protection apparatus of one preferred embodiment of the invention, when any of the overcurrent condition, the over-discharge condition, the discharge-state overcurrent condition, the short-circuit condition or the charge-state overcurrent condition is detected by the corresponding detector, the corresponding detector outputs a control signal to an oscillator circuit. The oscillator circuit starts outputting of a clock signal to a counter circuit. The output of the oscillator circuit is connected to the input of the counter circuit. The counter circuit starts counting of the clock signals received from the oscillator circuit. When the count value obtained at the counter circuit reaches a predetermined delay time, the control unit sets the switch in OFF state. In other words, when the delay time is reached after the detection of the undesired condition, the control unit sets the switch in OFF state. Since the charge/discharge current line to which the secondary battery is connected is cut off at the switch in the undesired condition, the charge/discharge protection apparatus protects the secondary battery from damage.

Therefore, the charge/discharge protection apparatus of the present invention is capable of of detecting a charge-state overcurrent condition of the battery with no need for an externally attached fuse, and is effective in safely and reliably protecting the battery against the charge-state overcurrent by- eliminating the charge-state overcurrent condition. There is no need for an externally attached fuse or the like to protect the battery against the charge-state overcurrent condition, and the manufacturing cost can be reduced.

In the charge/discharge protection apparatus of one preferred embodiment of the invention, a delay circuit, a test terminal, a test-mode switch and a delay time reducing unit are provided to reduce the entire period of a testing time of the charge/discharge protection apparatus. It is possible for the charge/discharge protection apparatus of the preferred embodiment to shorten the entire period of the testing time when performing an operation test of the charge/discharge protection apparatus that requires accurate measurement of the detection voltage with respect to the overcharge condition of the battery.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of preferred embodiments of the present invention with reference to the accompanying drawings.

Figure 1:
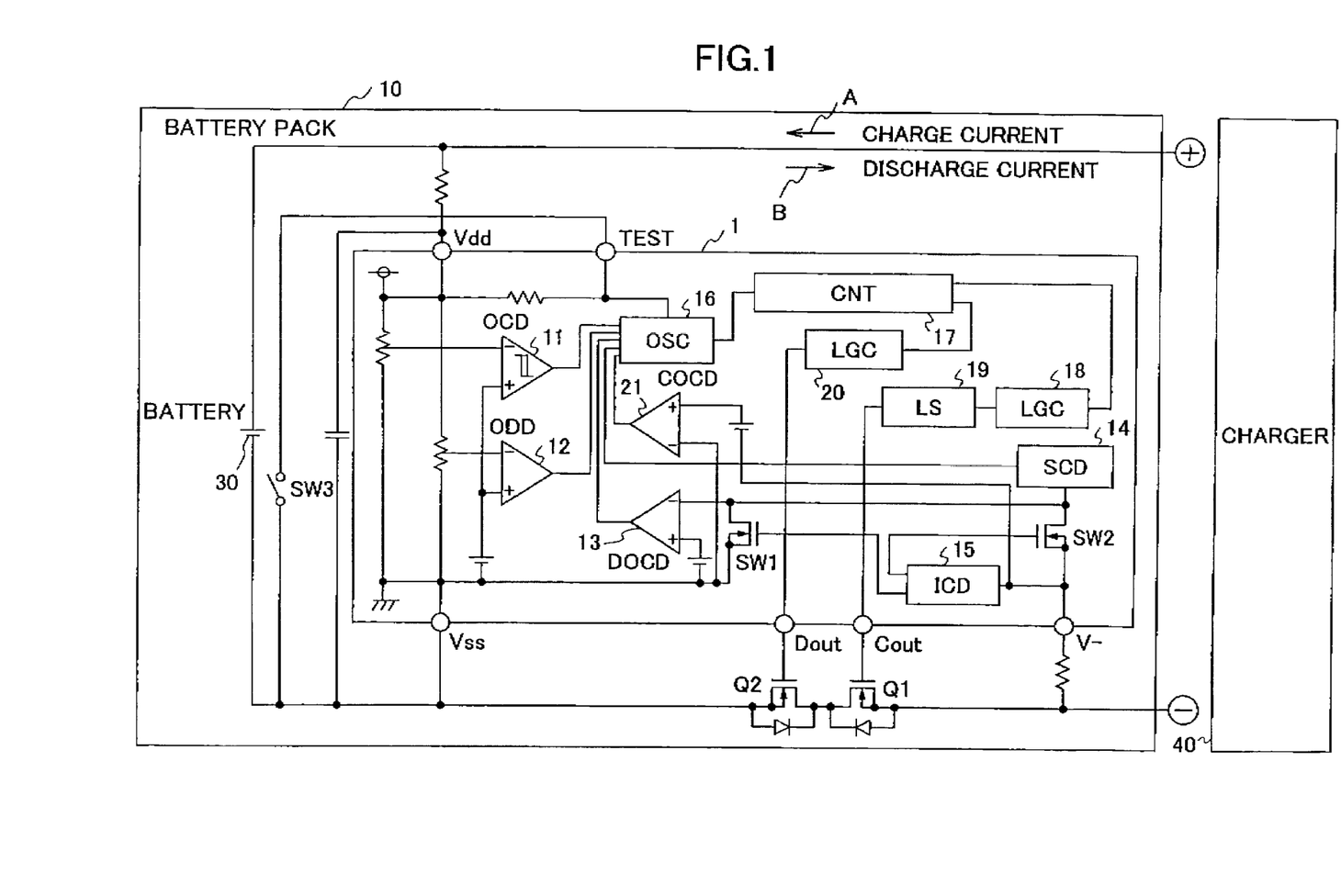
FIG. 1 is a block diagram of a battery pack in which one preferred embodiment of the charge/discharge protection apparatus of the invention is provided.

FIG. 1 shows a battery pack in which one preferred embodiment of the charge/discharge protection apparatus of the invention is provided.

As shown in FIG. 1, the battery pack 10 of the present embodiment has two major components: a charge/discharge protection apparatus 1 and a secondary battery 30. The charge/discharge protection apparatus 1 of the present embodiment generally includes an overcharge detector (OCD) 11, an over-discharge detector (ODD) 12, a discharge-state overcurrent detector (DOCD) 13, a short-circuit detector (SCD) 14, an improper charger detector (ICD) 15, an oscillator circuit (OCS) 16, a counter circuit (CNT) 17, a logic circuit (LGC) 18, a level shifter circuit (LS) 19, a logic circuit (LGC) 20, and a charge-state overcurrent detector (COCD) 21, which are formed on an integrated circuit (IC) chip.

The function of the discharge-state overcurrent detector 13 is essentially the same as the function of the overcurrent detector in the conventional charge/discharge protection circuit described earlier. The charge/discharge protection apparatus 1, formed on the IC chip, has six input/output terminals: Vdd, Vss, Dout, Cout, V−, and TEST.

Further, the charge/discharge protection apparatus 1 includes a switch SW1 and a switch SW2, the switch SW1 provided between the discharge-state overcurrent detector 13 and the improper charger detector 15, and the switch SW2 provided between the terminal V− and each of the discharge-state overcurrent detector 13 and the short-circuit detector 14.

Further, the battery pack 1 of the present embodiment includes a charge control FET switch Q1, a discharge control FET switch Q2, and a test-mode switch SW3. When the battery pack 1 is in the discharge state, a mobile electronic system is connected between the "plus" terminal (or the positive terminal) and the "minus" terminal (or the negative terminal) of the battery pack 1 and the discharge current from the battery 30 flows in the direction indicated by the arrow "B" in FIG. 1. The battery voltage is supplied from the battery pack 1 to the mobile electronic system via the battery pack terminals. When the battery pack 1 is in the charge state, a charger 40 is connected between the plus terminal and the minus terminal of the battery pack 1 and the charge current from the charger 40 flows in the opposite direction indicated by the arrow "A" in FIG. 1. The charger 40 in this state puts the rechargeable battery 30 on charge. The charging voltage is supplied from the charger 40 to the battery 30 in the battery pack 1 via the battery pack terminals. The charge control FET switch Q1 and the discharge control FET switch Q2 are provided at intermediate positions on the charge/discharge current line that connects the plus terminal and the minus terminal of the battery pack 10 and delivers the electrical charge current from the charger 40 to the battery 30 in the direction "A" or the electrical discharge current from the battery 30 to the mobile electronic system (not shown) in the direction "B".

Further, when conducting an operation test of the charge/discharge protection apparatus 1 of the battery pack 10, the test-mode switch SW3 is set in ON state, so that the terminal TEST of the IC chip is temporarily set to the low level.

In the battery pack 10 of FIG. 1, the overcharge detector 11, the over-discharge detector 12, the discharge-state overcurrent detector 13, the short-circuit detector 14, the improper charger detector 15, and the switches SW1 and SW2 are essentially the same as corresponding elements in the battery pack disclosed in U.S. patent application Ser. No. 09/702,651, filed on Nov. 1, 2000, which has been assigned to the assigner of the present application. The entire contents of U.S. patent application Ser. No. 09/702,651 are hereby incorporated by reference.

In the charge/discharge protection apparatus 1 of FIG. 1, the overcharge detector 11 detects an overcharge condition of the battery 30 when the battery pack 10 is set in the charge state. The over-discharge detector 12 detects an over-discharge condition of the battery 30 when the battery pack 10 is set in the discharge state. The discharge-stare overcurrent detector 13 detects a discharge-state overcurrent condition of the battery 30 when the battery pack 1 is set in the discharge state. The short-circuit detector 14 detects a short-circuit condition of the battery pack terminals. The charge-state overcurrent detector 21 detects a charge-state overcurrent condition of the battery 30 when the battery pack 1 is set in the charge state.

The charge/discharge protection apparatus 1 sets one of the FET switches Q1 and Q2 in OFF state, in order to protect the battery 30 from being damaged, when the overcharge condition, the over-discharge condition, the discharge-state overcurrent condition, the short-circuit condition or the charge-state overcurrent condition occurs in the battery pack 1. A description will now be given of the battery protecting operation of the charge/discharge protection apparatus 1 of the present embodiment.

In the charge/discharge protection apparatus 1 of FIG. 1, when any of the overcharge condition, the over-discharge condition, the discharge-state overcurrent condition, the short-circuit condition or the charge-state overcurrent condition is detected by a corresponding one of the detectors 11, 12, 13, 14 and 21, the oscillator circuit 16 starts outputting of a clock signal to the counter circuit 17. The output of the oscillator circuit 16 is connected to the input of the counter circuit 17. The counter circuit 17 starts counting of the clock signals received from the oscillator circuit 16. One of the two outputs of the counter circuit 17 is connected to the input of the logic circuit 18, while the other output of the counter circuit 17 is connected to the logic circuit 20. When the count value obtained at the counter circuit 17 reaches a predetermined value (the delay time) that is set to one of the logic circuits 18 and 20, the related logic circuit 18 (or 20) sets one of the FET switch Q1 and Q2 in OFF state. In other words, when the delay time is reached after the detection of the undesired condition, the logic circuit 18 or 20 sets the related FET switch in OFF state. Since the charge/discharge current line to which the secondary battery 30 is connected is cut off at the related FET switch in such a condition, the charge/discharge protection apparatus 1 protects the secondary battery 30 from damage.

Specifically, when the overcharge condition or the charge-state overcurrent condition is detected, the logic circuit 18 and the level shifter 19 sets the output signal of the terminal Cout to the low level, so that the charge control FET switch Q1 is set in OFF state. The level shifter 19 is provided to shift the Vss level to the V− level that is appropriate to control the PET switch Q1. On the other hand, when any of the over-discharge condition, the discharge-state overcurrent condition or the short-circuit condition is detected, the logic circuit 20 sets the output signal of the terminal Dout to the low level, so that the discharge control FET switch Q2 is set in OFF state. In either case, the charge/discharge current line of the battery pack 10 is cut off at the intermediate position by the related FET switch Q1 or Q2. Thus, the charge/discharge protection apparatus 1 protects the battery 30 from being damaged.

When the charger 40 is connected to the battery pack 10 to cause the charge current from the charger 40 to flow into the battery 30 in the direction "A", the source voltage of the FET switch Q1 is lower than the source voltage of the FET switch Q2. The source voltage of the FET switch Q2 is equal to the voltage of the terminal Vss of the IC chip (which voltage is called the ground voltage), and the source voltage of the FET switch Q1 is nearly equal to the voltage of the terminal V− of the IC chip. Although a resistor is provided between the source of the FET switch Q1 and the terminal V−, the terminal V− has high impedance and the source voltage of the FET switch Q1 is nearly equal to the voltage of the terminal V−.

Thus, when the charge current flows in the direction "A" in the battery pack 10, the voltage of the terminal V− is lower than the voltage of the terminal Vss. The charge-state overcurrent detector 21 of the present embodiment detects a charge-state overcurrent condition of the battery when a difference between the terminal Vss voltage and the terminal V− voltage is larger than a predetermined value (which is referred to as a reference voltage "Vchgdet" for detection of the charge-state overcurrent condition). At this time, the logic circuit 18 and the level shifter 19 sets the output signal of the terminal Cout to the low level, so that the FET switch Q1 is set in OFF state. The relationship between the detected overcurrent value I, the reference voltage Vchgdet, and the ON resistances Ron1 and Ron2 of the FET switches Q1 and Q2 is as follows.

$$I=Vchgdet/(Ron1+Ron2)$$

Figure 2:
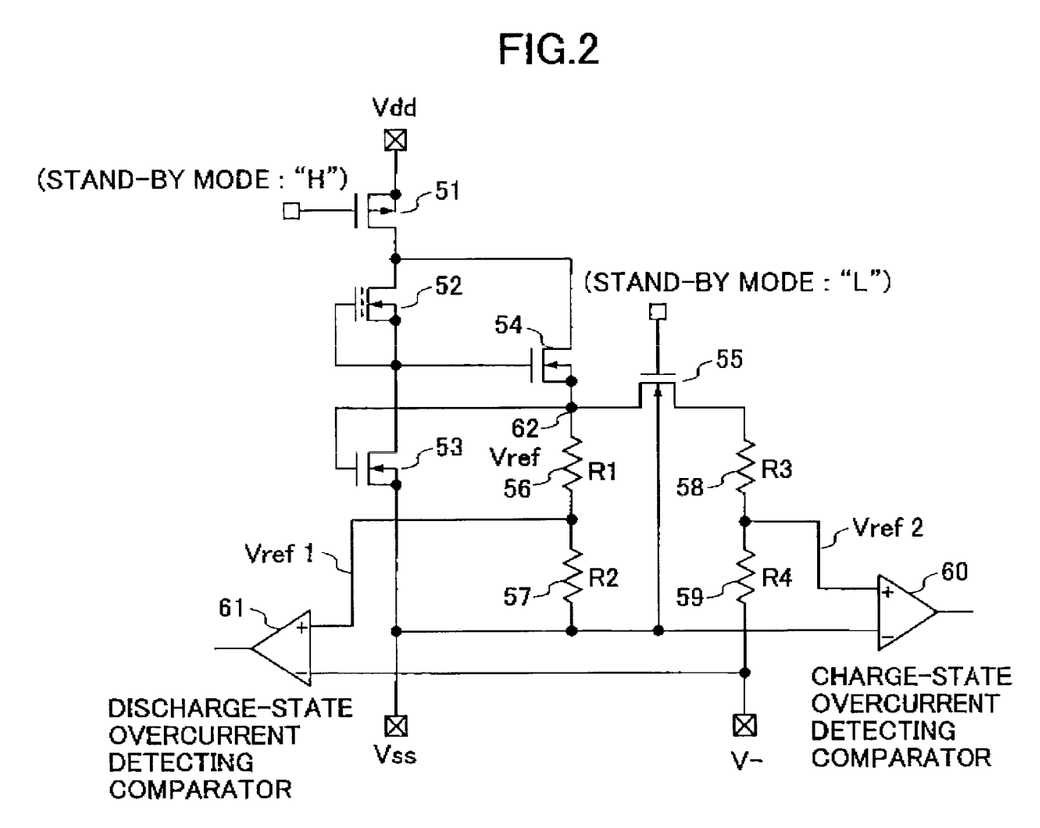
FIG. 2 is a circuit diagram of a discharge-state overcurrent detector and a charge-state overcurrent detector in the charge/discharge protection apparatus of the present embodiment.

FIG. 2 shows a configuration of a discharge-state overcurrent detector 13 and a charge-state overcurrent detector 21 in the charge/discharge protection apparatus 1 of the present embodiment. As described earlier, the detectors 13 and 21 are formed on the IC chip.

It is known to one of ordinary skill in the art that a constant voltage is generated at the node 62 in the configuration wherein an n-channel depression transistor 52, n-channel enhancement transistors 53 and 54, and resistors 56 and 57 are connected as shown in FIG. 2. In the configuration shown in FIG. 2, the discharge-state overcurrent detector 13 is constructed by the terminal Vdd, the terminal Vss, the terminal V−, the transistors 52–54, the resistors 56 and 57, and a discharge-state overcurrent detecting comparator 61, while the charge-state overcurrent detector 21 is constructed by the terminal Vdd, the terminal Vss, the terminal V−, the transistors 52–54, the resistors 56–59, and a charge-state overcurrent detecting comparator 60. In an alternative embodiment, the charge-state overcurrent detector 21 may use a single resistor in place of the resistors 56 and 57.

In the configuration shown in FIG. 2, a p-channel transistor 51 and an n-channel transistor 55 are set in ON state in a normal condition (a stand-by mode). The battery voltage is supplied to the terminal Vdd of the IC chip, the terminal Vss of the IC chip is grounded, and the terminal V− of the IC chip is connected to the "minus" terminal (the negative terminal) of the battery pack 10, as shown in FIG. 1.

Specifically, in the charge-state overcurrent detector 21 of the configuration in FIG. 2, the transistor 52 has a drain connected to the terminal Vdd, and a source and a gate being connected together. The transistor 53 has a gate, a drain connected to the source of the transistor 52, and a source connected to the terminal Vss. The transistor 54 has a drain connected to the drain of the transistor 52, a source connected to the gate of the transistor 53, and a gate connected to the source of the transistor 51. The resistors 58 and 59 are connected in series between the terminal V− and the source (the node 62) of the transistor 54. A single resistor (in place of the resistors 56 and 57) is connected between the terminal Vss and the source (the node 62) of the transistor 54. The charge-state overcurrent detecting comparator 60 has an inverting input connected to the terminal Vss and a non-inverting input connected to the intermediate point between the resistor 58 and the resistor 59. The comparator 60 outputs a high-level signal to the oscillator circuit 17 when the charge-state overcurrent condition of the battery 30 is detected in the charge state of the battery pack 10.

Suppose that "Vtnd" indicates a threshold voltage of the n-channel depression transistor 52, "Ld" indicates a length of the transistor 52, "Wd" indicates a width of the transistor 52, "Kd" indicates the K value of the transistor 52, "Vtne" indicates a threshold voltage of the n-channel enhancement transistor 53, "Le" indicates a length of the transistor 53, "We" indicates a width of the transistor 53, and "Ke" indicates the K value of the transistor 53. Further, suppose that Kd'=Kd×Wd/Ld, and Ke'=Ke×We/Le. The reference voltage Vref (the constant voltage) that is generated at the node 62 of the configuration in FIG. 2 is represented by the following formula.

$$Vref=Vtne-(Kd'/Ke')^{1/2} \times Vtnd$$

An intermediate voltage between the reference voltage Vref and the terminal voltage Vss is generated at the intermediate location between the resistor 56 and the resistor 57, and this intermediate voltage is supplied as a reference voltage Vref1 to the non-inverted input of the discharge-state overcurrent detecting comparator 61. The terminal voltage V⁻ is supplied to the inverted input of the comparator 61. Suppose that the resistor 56 has a resistance R1 and the resistor 57 has a resistance R2. Hence, the reference voltage Vref1 of the comparator 61 is represented by the following formula.

$$Vref1=Vref \times R2/(R1+R2)$$

If a discharge-state overcurrent flows into the battery 30 in the direction "B" in the battery pack 10, the terminal voltage V⁻ at the inverted input of the comparator 61 is higher than the reference voltage Vref1 at the non-inverted input of the comparator 61. In this condition, the comparator 61 outputs a high-level signal to the oscillator circuit 16 in the charge/discharge protection apparatus 1. Namely, the discharge-state overcurrent detector 13 detects the discharge-state overcurrent condition of the battery 30 when the battery pack 10 is set in the discharge state. When the delay time is reached after the detection of the discharge-state overcurrent condition, the logic circuit 20 sets the output signal of the terminal Dout to the low level, so that the discharge control FET switch Q2 is set in OFF state. Hence, the discharge-state overcurrent detector 13 is effective in safely preventing the discharge-state overcurrent from subsequently flowing into the battery 30.

Similar to the detection of the discharge-state overcurrent condition described above, the charge-state overcurrent detector 21 detects a charge-state overcurrent condition of the battery 30 when the battery pack 10 is set in the charge state.

An intermediate voltage between the reference voltage Vref (at the node 62) and the terminal voltage $V^-$ is generated at the intermediate location between the resistor 58 and the resistor 59, and this intermediate voltage is supplied as a reference voltage Vref2 to the non-inverted input of the charge-state overcurrent detecting comparator 60. The terminal voltage Vss is supplied to the inverted input of the comparator 60. Suppose that the resistor 58 has a resistance R3 and the resistor 59 has a resistance R4. Hence, the reference voltage Vref2 of the comparator 60 is represented by the following formula.

$$Vref2 = Vref - (Vref - V^-) \times [R3/(R3+R4)] = [R4/(R3+R4)] \times Vref + \{R3/(R3+R4)\} \times V^-$$

The value of the terminal voltage $V^-$ when the reference voltage Vref2 supplied to the non-inverted input of the comparator 60 reaches the terminal voltage Vss (or zero volt) is the reference voltage "Vchgdet" for detection of the charge-state overcurrent condition. If a charge-state overcurrent flows into the battery 30 in the direction "A" in the battery pack 10, the terminal voltage $V^-$ is lower than the level when the reference voltage Vref2 (at the non-inverted input of the comparator 60) is equal to zero volt (or the terminal voltage Vss at the inverted input of the comparator 60). In this condition, the comparator 60 outputs a high-level signal to the oscillator circuit 16. Namely, the charge-state overcurrent detector 21 detects the charge-state overcurrent condition of the battery 30 when the battery pack 10 is set in the charge state. When the delay time is reached after the time of the detection, the logic circuit 18 and the level shifter 19 sets the output signal of the terminal Cout to the low level, so that the charge control FET switch Q1 is set in OFF state. Hence, the charge-state overcurrent detector 21 of the present embodiment is effective in safely preventing the charge-state overcurrent from subsequently flowing into the battery 30.

It is apparent from the foregoing description that the reference voltage "Vchgdet" for detection of the charge-state overcurrent condition is determined as follows.

$$\{R4/(R3+R4)\} \times Vref + \{R3/(R3+R4)\} \times Vchgdet = 0 \quad Vchgdet = -(R4/R3) \times Vref$$

In the configuration shown in FIG. 2, the n-channel transistor 55 serves as a switch that is set in OFF state when the over-discharge condition of the battery occurs. The OFF state of the transistor 55 cuts off the current path between the terminals Vss and V– through the resistors 56–59, so that the power consumption of the battery pack 10 is reduced. When the over-discharge condition is detected, the output signal of the terminal Dout is set to the low level. Hence, the charge/discharge current line between the terminal Vss and the terminal V– has high impedance, and the potential of the terminal V– is raised to the level of the battery voltage Vdd. If the n-channel transistor 55 is not provided, the current flows through the current path between the terminals Vss and V– through the resistors 56–59. When the over-discharge condition is detected, it is required to reduce the consumption power of the battery pack 10 so as to prevent the lowering of the battery power. To meet the requirement, it is necessary to provide the n-channel transistor 55 between the resistor 56 and the resistor 58 which serves to cut off the current path between the terminals Vss and V– through the resistors 56–59 when the over-discharge condition occurs.

In the charge/discharge protection apparatus 1 of FIG. 1, the improper charger detector 15 detects whether an improper charger, supplying an excessively high charging voltage to the battery 30, is connected to the battery pack 10 in response to the charging voltage of the improper charger supplied to the terminal V–, When the connection of the improper charger and the battery pack 10 is detected, the improper charger detector 15 sets the switch SW1 in ON state and sets the switch SW2 in OFF state. The improper charger detector 15 in the present embodiment is essentially the same as the corresponding element of the battery pack disclosed in the above-mentioned U.S. patent application Ser. No. 09/702,651. For a detailed description of the improper charger detector, see the specification of U.S. patent application Ser. No. 09/702,651.

Normally, in the charge/discharge protection apparatus 1 of the present embodiment, the delay time upon detection of the over-discharge condition is set to about 16 ms, the delay time upon detection of the discharge-state overcurrent condition is set to about 10 ms, and the delay time upon detection of the short-circuit condition is set to about 1 ms. However, the delay time upon detection of the overcharge condition is set to 1 second or more.

As described earlier, when conducting an operation test of the charge/discharge protection apparatus 1 of the battery pack 10, the test-mode switch SW3 is set in ON state, so that the terminal TEST of the IC chip is temporarily set to the low level. The oscillator circuit 16 has an input connected to the terminal TEST. When the terminal TEST is set to the lower level, the oscillation frequency of the oscillator circuit 16 is increased and the delay times upon detection of the various conditions of the battery are shortened by the increased oscillation frequency of the oscillator circuit 16. The charge/discharge protection apparatus 1 of the present embodiment is effective in reducing the entire period of the operation test, especially in the case of the operation test using the delay time upon detection of the overcharge condition.

Figure 3:
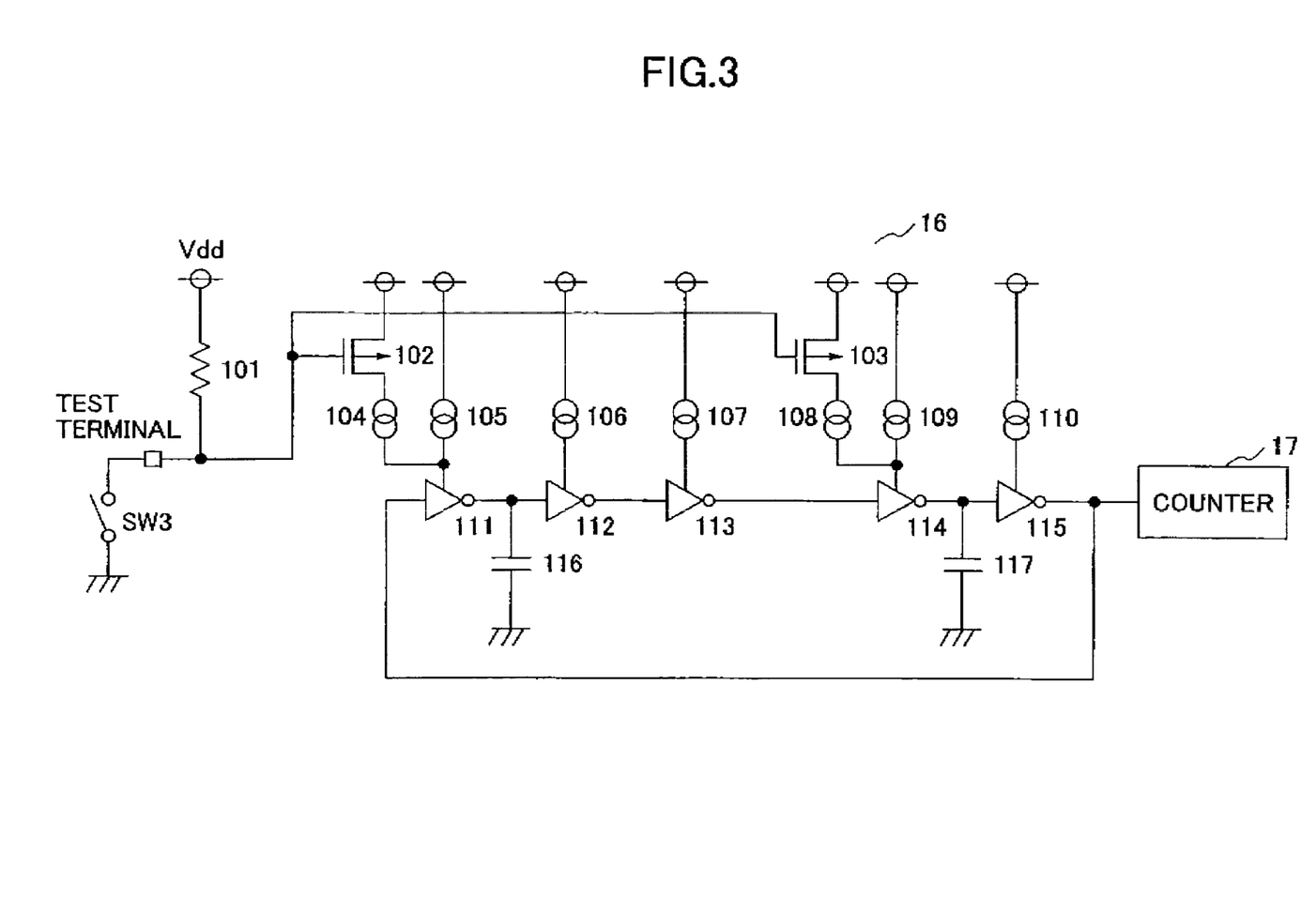
FIG. 3 is a circuit diagram of an oscillator circuit having a testing function in the charge/discharge protection apparatus of the present embodiment.

FIG. 3 shows a configuration of an oscillator circuit having a testing function in the charge/discharge protection apparatus of the present embodiment.

As shown in FIG. 3, the oscillator circuit 16 of the present embodiment has a testing function, and it is constructed by using a ring oscillator that includes five constant-current inverters 111 through 115, and two capacitors 116 and 117. The oscillator circuit 16 includes a plurality of constant-current sources 104 through 110, and two p-channel MOS transistors 102 and 103. In the ring oscillator, the inverters 111–115 are arranged in a ring formation such that the inverters 111–115 are connected in series, and the output of the inverter 115 is connected to the input of the inverter 111. Further, the output of the inverter 115 (or the output of the oscillator circuit 16) is connected to the input of the counter circuit 17.

The oscillation frequency of this ring oscillator is determined by the three factors: (1) the current value of the constant-current sources 105 and 109; (2) the capacitance value of the capacitors 116 and 117; and (3) the threshold voltage of the inverters 112 and 115.

The terminal TEST is connected to the terminal Vdd (the battery voltage) via a pull-up resistor 101. The switch SW3 is connected at one end to the terminal TEST, and connected at the other end to the terminal Vss (the ground voltage). When the switch SW3 is set in OFF state (as shown in FIG. 3), the output signal of the terminal TEST is set to the high level. The high-level voltage at one end of the pull-up resistor 101 sets the gate voltages of the transistors 102 and 103 to the high level. The transistors 102 and 103 are set in OFF state. At this time, the oscillation frequency of the ring oscillator is determined by (1) the current value of the constant-current sources 105 and 109, (2) the capacitance value of the capacitors 116 and 117, and (3) the threshold voltage of the inverters 112 and 115.

On the other hand, when the switch SW3 is set in ON state (not shown in FIG. 3), the output signal of the terminal TEST is set to the low level. The gate voltages of the transistors 102 and 103 are set to the low level. The transistors 102 and 103 are set in ON state. At this time, the oscillation frequency of the ring oscillator is increased by the current value of the constant-current source 104 added to that of the constant-current source 105, and the current value of the constant-current source 108 added to that of the constant-current source 109. The delay times upon detection of the various conditions of the battery are shortened by the increased oscillation frequency of the oscillator circuit 16. The charge/discharge protection apparatus 1 of the present embodiment is effective in reducing the entire period of the operation test, especially in the case of the operation test using the delay time upon detection of the overcharge condition.

For example, in the oscillator circuit 16 shown in FIG. 3, if the ratio of the current value of the source 104 to the current value of the source 105 is set to 9:1 and the ratio of the current value of the source 108 to the current value of the source 109 is set to 9:1, the oscillation frequency of the ring oscillator is increased by 10 times and the delay times are shortened by ¹⁄₁₀. In such a case, the entire period of the operation test of the IC chip containing the charge/discharge protection circuit can be remarkably reduced.

In the configuration of FIG. 3, the delay time is varied by changing the current value of the constant-current sources through the switching ON/OFF of the switch SW3. Alternatively, the delay time may be varied by changing the capacitance value of the capacitors through the switching ON/OFF of the switch SW3.

Figure 4:
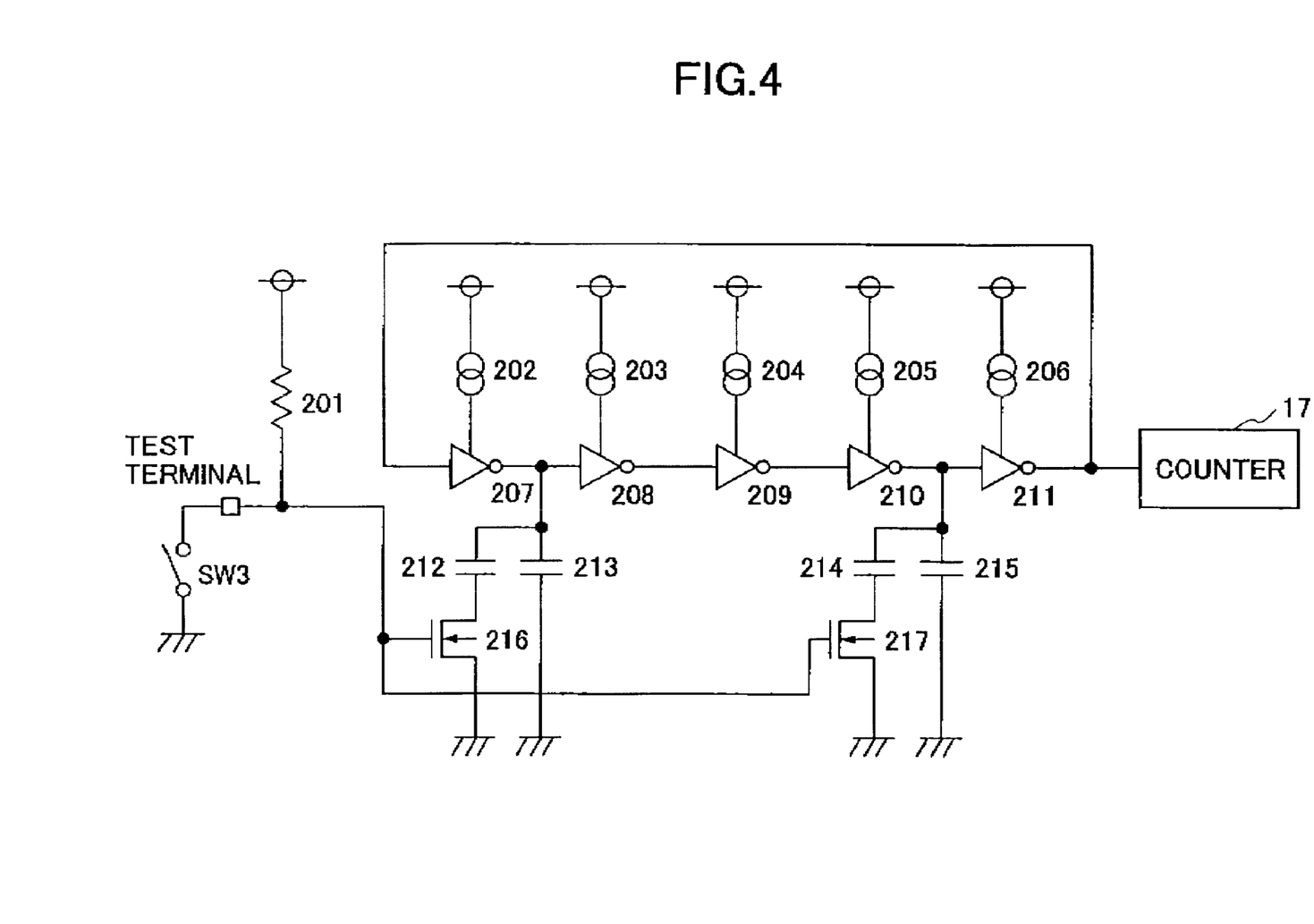
FIG 4 is a circuit diagram of another oscillator circuit having the testing function in the charge/discharge protection apparatus of the present embodiment.

FIG. 4 shows a configuration of another oscillator circuit having the testing function in the charge/discharge protection apparatus of the present embodiment.

As shown in FIG. 4, the oscillator circuit 16 of the present embodiment has the testing function, and it is constructed by using a ring oscillator that includes five constant-current inverters 207 through 211, and four capacitors 212 through 215. The oscillator circuit 16 includes a plurality of constant-current sources 202 through 206, and two n-channel MOS transistors 216 and 217. In the ring oscillator, the inverters 207–211 are arranged in a ring formation such that the inverters 207–211 are connected in series, and the output of the inverter 211 is connected to the input of the inverter 207. Further, the output of the inverter 211 (or the output of the oscillator circuit 16) is connected to the input of the counter circuit 17.

The terminal TEST is connected to the terminal Vdd (the battery voltage) via a pull-up resistor 201. The switch SW3 is connected at one end to the terminal TEST, and connected at the other end to the terminal Vss (the ground voltage). When the switch SW3 is set in OFF state (as shown in FIG. 4), the output signal of the terminal TEST is set to the high level (the battery voltage). The high-level voltage at one end of the pull-up resistor 201 sets the gate voltages of the transistors 216 and 217 to the high level. The transistors 216 and 217 are set in ON state. At this time, the oscillation frequency of the ring oscillator is determined by a sum of the capacitance values of the capacitors 212 and 213 and a sum of the capacitance values of the capacitors 214 and 215.

On the other hand, when the switch SW3 is set in ON state (not shown in FIG. 4), the output signal of the terminal TEST is set to the low level. The gate voltages of the transistors 216 and 217 are set to the low level (the ground voltage). The transistors 216 and 217 are set in OFF state. At this time, the oscillation frequency of the ring oscillator is increased by the reduction of the capacitance value of the capacitors (the capacitors 212 and 214 are set in OFF state). The delay times upon detection of the various conditions of the battery are shortened by the increased oscillation frequency of the oscillator circuit 16. The charge/discharge protection apparatus 1 of the present embodiment is effective in reducing the entire period of the operation test, especially in the case of the operation test using the delay time upon detection of the overcharge condition.

In the configuration of FIG. 4, the delay time is varied by changing the capacitance value of the capacitors through the switching ON/OFF of the switch SW3. Alternatively, the delay time may be varied by changing the threshold voltage of the constant-current inverters through the switching ON/OFF of the switch SW3.

Figure 5A:
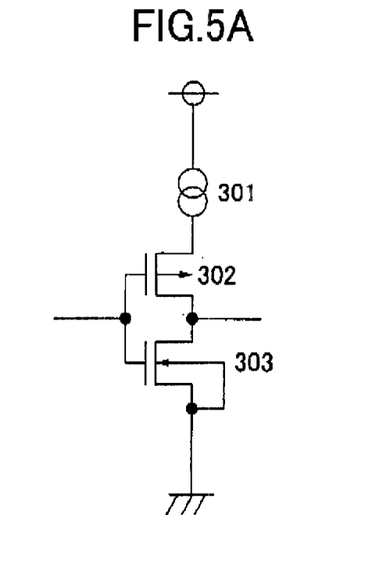
FIG. 5A and FIG. 5B are circuit diagrams of a constant-current inverter as a unit element of another oscillator circuit having the testing function in the charge/discharge protection apparatus of the present embodiment.
Figure 5B:
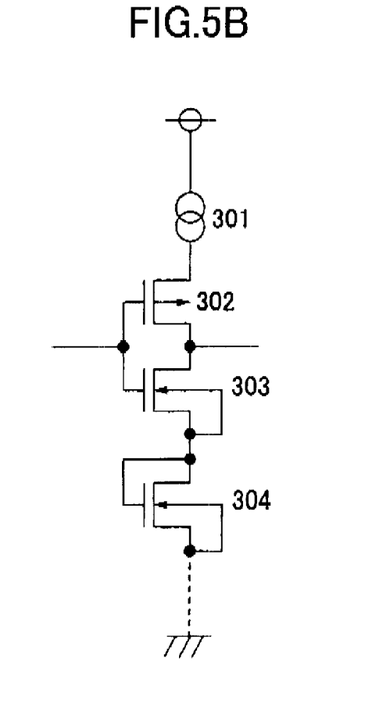

FIG. 5A and FIG. 5B show a configuration of a constant-current inverter as a unit element of another oscillator circuit having the testing function in the charge/discharge protection apparatus of the present embodiment.

FIG. 5A shows a constant-current inverter as a unit element of the oscillator circuit in the present embodiment, the inverter having an initial threshold voltage. As shown in FIG. 5A, the constant-current inverter of this embodiment includes a constant-current source 301 and a CMOS (complementary metal oxide semiconductor) inverter, the CMOS inverter having a p-channel MOS transistor 302 and an n-channel MOS transistor 303.

FIG. 5B shows the constant-current inverter having an increased threshold voltage by connecting an n-channel MOS transistor 304 (which has the source coupled to the gate) in series to the n-channel MOS transistor 303. As shown in FIG. 5B, the threshold voltage is increased if the number of the n-channel MOS transistors 304 connected in series to the constant-current inverter shown in FIG. 5A is increased.

In the oscillator circuit having the above configuration, a bypass line is provided between the ends of the n-channel MOS transistors 304 connected in series, and a bypass MOS transistor is provided on the bypass line, and the switch SW3 is connected at one end to the gate of the bypass MOS transistor. According to such configuration, changing the threshold voltage of the constant-current inverters is carried out through the switching ON/OFF of the switch SW3 in a manner similar to the previous embodiments of FIG. 3 and FIG. 4.

For example, in the oscillator circuit 16 having the above-mentioned configuration, if the threshold voltage of the constant-current inverter is decreased by ½, the oscillation frequency of the ring oscillator can be increased, and the delay times can be shortened. In such a case, the entire period of the operation test of the IC chip containing the charge/discharge protection circuit can be remarkably reduced.

In the preceding embodiments, the delay time is varied by changing the oscillation frequency of the oscillator circuit 16 through the switching ON/OFF of the switch SW3. Alternatively, the delay time may be varied by changing the output signal position of the counter circuit 17 at which the signal from the counter circuit 17 is supplied to the logic circuit 18 or 20, instead of changing the oscillation frequency of the oscillator circuit 16.

Figure 6:
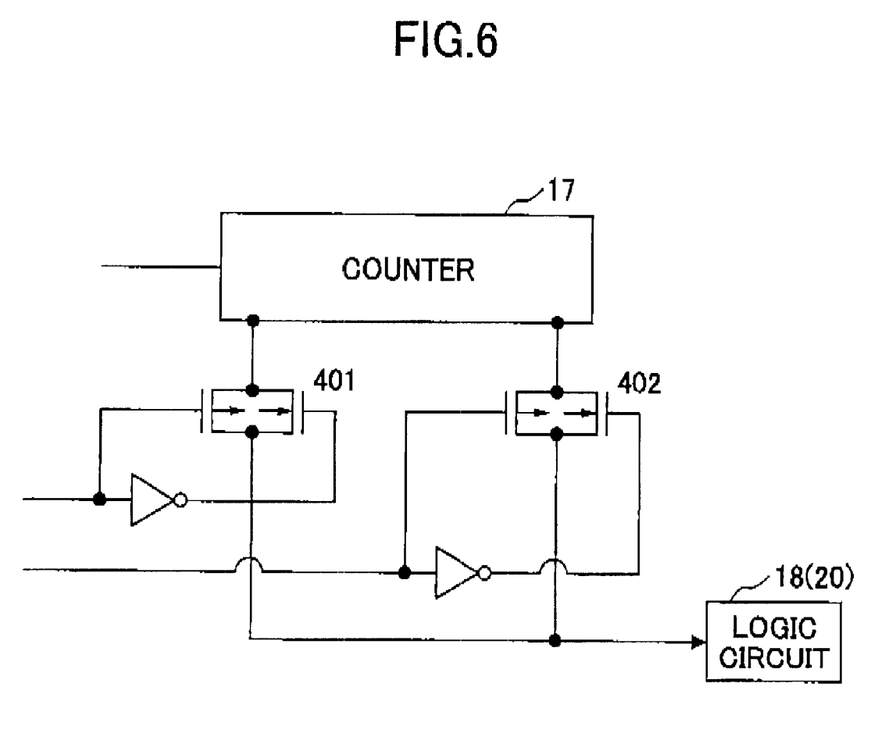
FIG. 6 is a circuit diagram of a counter circuit having a testing function in the charge/discharge protection apparatus of the present embodiment.

FIG. 6 shows a configuration of a counter circuit having a testing function in the charge/discharge protection apparatus of the present embodiment.

As shown in FIG. 6, the counter circuit 17 is provided with two output signal positions, and one of the output signal positions is connected to the logic circuit 18 (or 20) through a transmission gate 401, and the other of the output signal positions is connected to the logic circuit 18 (or 20) through a transmission gate 402. The ON/OFF state of the transmission gates 401 and 402 is controlled by sending a test signal thereto. According to the counter circuit 17 of the present embodiment, the delay time can be varied by changing the output signal position of the counter circuit 17 without changing the oscillation frequency of the oscillator circuit 16. The output signal position and the number of the output signal positions in the counter circuit 17 may be arbitrarily selected.

Alternatively, the delay time may be varied by selecting one of a low-frequency oscillator and a high-frequency oscillator in an internal oscillator circuit through the switching ON/OFF of the switch SW3. In such alternative embodiment, the charge/discharge protection apparatus 1 further includes a delay circuit that determines the delay time upon detection of any of the overcharge condition, the over-discharge condition, the discharge-state overcurrent condition or the charge-state overcurrent condition. The delay circuit is constructed by an internal oscillator circuit and an internal counter circuit. The internal oscillator circuit includes a low-frequency oscillator and a high-frequency oscillator. When the battery pack is set in a normal operation, the charge/discharge protection apparatus selects the low-frequency oscillator in the internal oscillator circuit for the protection of the battery. When the battery pack is set in a test mode, the charge/discharge protection apparatus selects the high-frequency oscillator in the internal oscillator circuit so as to reduce the testing time of the charge/discharge protection apparatus.

The above-described charge/discharge protection apparatus provides increased reliability of the battery pack and shortens the entire period of a testing time when it is incorporated into the battery pack. The battery pack of the above-described embodiment is applicable to several mobile electronic systems, such as mobile phones, digital cameras and mini-disk drives.

In the above-described embodiments in FIG. 3 and FIG. 4, the test terminal of the IC chip is connected to the battery voltage Vdd via the pull-up resistor 101 or 201. When the switch SW3 is set in ON state, the output signal of the terminal TEST is set to the low level. The oscillation frequency of the oscillator is increased. The delay times upon detection of the various conditions of the battery are shortened by the increased oscillation frequency of the oscillator circuit. Alternatively, the test terminal of the IC chip may be connected to the battery voltage Vdd via a pull-down resistor, and the output signal of the terminal TEST may be set to the high level in order to increase the oscillation frequency of the ring oscillator. The charge/discharge protection apparatus 1 of such alternative embodiment is also effective in reducing the entire period of the operation test, especially in the case of the operation test using the delay time upon detection of the overcharge condition. The output signal of the terminal TEST may be set to the high level in order to increase the oscillation frequency of the ring oscillator.

In the above-described embodiments in FIG. 3 and FIG. 4, the ring oscillator, which is constructed by the five constant current inverters, is incorporated into the oscillator circuit having the testing function. Alternatively, another ring oscillator having a different configuration or an oscillator of another type may be incorporated into the oscillator circuit having the testing function.

The present invention is not limited to the above-described embodiments, and variations and modifications may be made without departing from the scope of the present invention.

Further, the present invention is based on Japanese priority application No. 2000-296457, filed on Sep. 28, 2000, the entire contents of which are hereby incorporated by reference.

What is claimed is:

1. A charge/discharge protection apparatus for protecting a secondary battery of a battery pack from damage, comprising:

a switch provided on a charge/discharge current line, the charge/discharge current line being connected to the battery;

a charge-state overcurrent detector outputting a control signal when a charge-state overcurrent condition of the battery is detected in a charge state of the battery pack; and a control unit setting the switch in OFF state to cut off connection between the charge/discharge current line and the battery in response to the control signal output by the charge-state overcurrent detector.

2. A charge/discharge protection apparatus for protecting a secondary battery of a battery pack from damage, comprising:

a switch provided on a charge/discharge current line, the charge/discharge current line being connected to the battery;

a charge-state overcurrent detector outputting a control signal when a charge-state overcurrent condition of the battery is detected in a charge state of the battery pack; and a control unit setting the switch in OFF state to cut off connection between the charge/discharge current line and the battery in response to the control signal output by the charge-state overcurrent detector; and wherein the charge/discharge protection apparatus includes a first terminal connected to a positive electrode of the battery, a second terminal connected to a negative electrode of the battery, and a third terminal connected to a negative terminal of the battery pack, the charge-state overcurrent detector comprising:

a first MOS transistor having a drain connected to the first terminal, and a source and a gate being connected together;

a second MOS transistor having a gate, a drain connected to the source of the first MOS transistor, and a source connected to the second terminal;

a third MOS transistor having a drain connected to the drain of the first MOS transistor, a source connected to the gate of the second MOS transistor, and a gate connected to the source of the first MOS transistor;

first and second resistors connected in series between the third terminal and the source of the third MOS transistor;

a third resistor connected between the second terminal and the source of the third MOS transistor; and a comparator having a first input connected to the second terminal and a second input connected to an intermediate point between the first resistor and the second resistor, the comparator outputting the control signal when the charge-state overcurrent condition of the battery is detected in the charge state of the battery pack.

3. The charge/discharge protection apparatus according to claim 2, wherein the charge-state overcurrent detector includes a second switch connected between the first resistor and the third resistor, said second switch being set in OFF state to cut off connection between the first resistor and the third resistor when an over-discharge condition of the battery is detected.

4. A charge/discharge protection apparatus for protecting a secondary battery of a battery pack from damage, comprising:

a switch provided on a charge/discharge current line, the charge/discharge current line being connected to the battery;

a charge-state overcurrent detector outputting a control signal when a charge-state overcurrent condition of the battery is detected in a charge state of the battery pack; and a control unit setting the switch in OFF state to cut off connection between the charge/discharge current line and the battery in response to the control signal output by the charge-state overcurrent detector; and wherein said protection apparatus further comprises:

a delay circuit delaying supply of the control signal to the switch by a predetermined delay time after the detection of the charge-state overcurrent condition of the battery, the delay circuit having an internal oscillator and a counter;

a test-mode switch setting a potential of a test terminal to one of a low level and a high level when conducting an operation test of the charge/discharge protection apparatus; and a delay time changing means for reducing the delay time of the delay circuit when the potential of the test terminal is set to one of the low level and the high level by the test-mode switch.

5. The charge/discharge protection circuit according to claim 4, wherein the internal oscillator is configured into a ring oscillator having a plurality of constant-current inverters and a plurality of constant-current sources, and the delay time changing means reduces, when the operation test is conducted, the delay time of the delay circuit by changing a current value of the constant-current sources in the ring oscillator.

6. The charge/discharge protection circuit according to claim 5, wherein, when reducing the delay time of the delay circuit, the delay time changing means activates at least one of the constant-current sources of the ring oscillator in order to increase the current value of the constant-current sources and increase an oscillation frequency of the ring oscillator.

7. The charge/discharge protection circuit according to claim 4, wherein the internal oscillator is configured into a ring oscillator having a plurality of constant-current inverters and a plurality of capacitors, and the delay time changing means reduces, when the operation test is conducted, the delay time of the delay circuit by changing a capacitance value of the capacitors in the ring oscillator.

8. The charge/discharge protection circuit according to claim 7, wherein, when reducing the delay time of the delay circuit, the delay time changing means inactivates at least one of the capacitors of the ring oscillator in order to reduce the capacitance value of the capacitors and increase an oscillation frequency of the ring oscillator.

9. The charge/discharge protection circuit according to claim 4, wherein the internal oscillator is configured into a ring oscillator having a plurality of constant-current inverters, and the delay time changing means reduces, when the operation test is conducted, the delay time of the delay circuit by changing a threshold voltage of the constant-current inverters in the ring oscillator.

10. The charge/discharge protection circuit according to claim 9, wherein each of the constant-current inverters includes a CMOS inverter, and, when reducing the delay time of the delay circuit, the delay time changing means connecting a MOS transistor in series to at least one of the constant-current inverters in order to increase the threshold voltage thereof.

11. The charge/discharge protection circuit according to claim 4, wherein the delay time changing means reduces, when the operation test is conducted, the delay time of the delay circuit by changing one of a plurality of signal output positions of the counter of the delay circuit to another.

12. The charge/discharge protection apparatus according to claim 4, wherein the oscillator of the delay circuit includes a low-frequency oscillator and a high-frequency oscillator, the charge/discharge protection apparatus selecting one of the low-frequency oscillator and the high-frequency oscillator in response to the potential of the test terminal.

13. A battery pack in which a secondary battery and a charge/discharge protection apparatus are provided, the charge/discharge protection apparatus comprising:

a switch provided on a charge/discharge current line, the charge/discharge current line being connected to the battery;

a charge-state overcurrent detector outputting a control signal when a charge-state overcurrent condition of the battery is detected in a charge state of the battery pack; and a control unit setting the switch in OFF state to cut off connection between the charge/discharge current line and the battery in response to the control signal output by the charge-state overcurrent detector, such that said charge-state overcurrent detector, said control unit and said switch prevent a charge current in said line from damaging said battery when said battery pack is in a charging state to charge said battery.

* * * * *